United States Patent
Bonnet (10) Patent No.: US 7,811,063 B2
(45) Date of Patent: Oct. 12, 2010

(54) DAMPING ELEMENT FOR A WIND TURBINE ROTOR BLADE

(75) Inventor: Laurent Bonnet, Mesum (DE)

(73) Assignee: General Electric Company, Schenectady, NY (US)

(*) Notice: Subject to any disclaimer, the term of this patent is extended or adjusted under 35 U.S.C. 154(b) by 1013 days.

(21) Appl. No.: 11/556,291

(22) Filed: Nov. 3, 2006

(65) Prior Publication Data

US 2008/0107540 A1  May 8, 2008

(51) Int. Cl.
    *F03D 11/00* (2006.01)
(52) U.S. Cl. .................. 416/229 R; 416/233; 416/500
(58) Field of Classification Search .............. 415/4.3, 415/4.5, 119, 908; 416/230, 232, 233, 500, 416/229 R; 244/1 R, 1 N, 17.11, 17.25
    See application file for complete search history.

(56) References Cited

U.S. PATENT DOCUMENTS

| | | | | |
|---|---|---|---|---|
| 2,426,130 A * | 8/1947 | Wald | ........................... | 416/145 |
| 2,873,946 A * | 2/1959 | Stalker | ........................ | 416/140 |
| 2,935,297 A * | 5/1960 | Stalker | ................... | 416/219 R |
| 2,956,774 A * | 10/1960 | Stalker | ................... | 416/210 R |
| 3,388,772 A * | 6/1968 | Marsh et al. | ................. | 188/379 |
| 3,966,357 A * | 6/1976 | Corsmeier | ................ | 416/97 R |
| 4,329,119 A * | 5/1982 | Baskin | ........................ | 416/226 |
| 4,926,963 A * | 5/1990 | Snyder | ........................ | 181/290 |
| 5,094,318 A * | 3/1992 | Maeda et al. | ................ | 181/290 |
| 5,165,860 A * | 11/1992 | Stoner et al. | ................. | 416/224 |
| 5,232,344 A * | 8/1993 | El-Aini | ........................ | 416/145 |
| 5,356,264 A * | 10/1994 | Watson et al. | ................ | 415/119 |
| 5,407,034 A * | 4/1995 | Vydra et al. | .............. | 188/73.37 |
| 5,690,035 A * | 11/1997 | Hatayama et al. | ........... | 105/452 |
| 5,895,013 A * | 4/1999 | Towfiq | ........................ | 244/119 |
| 6,213,721 B1 * | 4/2001 | Watkinson | .............. | 416/244 A |
| 6,827,551 B1 * | 12/2004 | Duffy et al. | .................. | 415/119 |
| 7,296,766 B2 * | 11/2007 | Drost | ........................... | 244/1 R |
| 7,296,977 B2 * | 11/2007 | Bonnet | ........................ | 416/230 |

* cited by examiner

*Primary Examiner*—Ninh H Nguyen
*Assistant Examiner*—Aaron R Eastman
(74) *Attorney, Agent, or Firm*—Global Patent Operation; Douglas D. Zhang

(57) ABSTRACT

A damping element for a wind turbine rotor blade is provided, the damping element comprising a laminate material made of at least one viscoelastic layer and at least one stiff layer adhered to said viscoelastic layer, wherein the damping element is adapted to be attached to a body of the rotor blade so that the at least one viscoelastic layer is in contact with the body of the rotor blade.

10 Claims, 7 Drawing Sheets

DAMPING ELEMENT FOR A WIND TURBINE ROTOR BLADE

BACKGROUND OF THE INVENTION

The present invention relates to a damping element for a wind turbine rotor blade, a wind turbine rotor blade including such a damping element and a wind turbine equipped with a wind turbine rotor blade having a damping element.

Wind turbine rotor blades are used to extract kinetic energy from the wind and to convert this kinetic energy into rotational energy of a driving shaft. Typically, the driving shaft is connected to an electric generator for power generation but may also be used to drive a pump, a mill work or the like. In any case, the rotor blades are subject to high loads caused by short-term fluctuations of wind speed. In particular, wind gust loads affect the structural blade design and permanent wind turbulence provides a substantial contribution to material fatigue of the rotor blades.

To withstand the above-described wind gust loads, wind turbine rotor blades are typically made from fiber-reinforced plastics with a polymer resin matrix. Some blade designs include also foam layers or a wooden core. Thus, the typical blade design and blade material composition exhibits a flexible construction with low structural damping, i.e. below about 1%. Typically, the flexible design results in first bending and/or torsional modes of the blade in a range of only a few Hertz. Furthermore, the low structural damping of the blade material is not sufficient for dampening such bending and/or torsional modes of the blade. Therefore, the rotor blades typically have high dynamic response so that the low bending and/or torsional modes of the blades are excited during operation. Thus, the high flexibility and low internal modal damping results in increased fatigue of the blade due to internal stresses. As a result, the lifetime of the blades is reduced by the bending and torsion thereof and fatigue fractures are likely to occur. Current approaches to cope with this problem use either high-strength materials to increase the blade stiffness and/or simply more material to increase structural damping. However, high-strength materials are relatively expensive and the use of more material leads to a considerable increase in blade mass.

BRIEF DESCRIPTION OF THE INVENTION

In view of the above, a damping element for a wind turbine rotor blade is provided, the damping element including a laminate material made of at least one viscoelastic layer and at least one stiff layer adhered to said viscoelastic layer, wherein the damping element is adapted to be attached to a body of the rotor blade so that the at least one viscoelastic layer is in contact with the body of the rotor blade.

Further aspects, advantages and features of the present invention are apparent from the dependent claims, the description and the accompanying drawings.

According to a first aspect of the invention, a damping element for a wind turbine rotor blade is provided, the damping element comprising a laminate material made of at least one viscoelastic layer and at least one stiff layer adhered to said viscoelastic layer, wherein the damping element is adapted to be attached to a body of the rotor blade so that the at least one viscoelastic layer is in contact with the body of the rotor blade.

The damping element according to the above aspect of the present invention is adapted for dampening torsional and/or bending modes of a rotor blade during operation. When the damping element is mounted to a rotor blade, kinetic energy from the bending and/or torsional motion of the blade body is transferred onto the soft viscoelastic layer attached to the body. The stiff layer adhered to the viscoelastic layer resists the motion of the viscoelastic layer so that shear stress is produced between the stiff layer and the viscoelastic layer. Thus, the vibrational energy of the torsional and/or bending modes is dissipated at the interface between the viscoelastic layer and the stiff layer. Accordingly, the damping element is a low cost and robust mechanic construction for reducing the blade dynamic fatigue. Furthermore, the damping elements can be provided as a modular system so that retrofitting of existing turbines can be done even in the field. Additionally, the damping element may also reduce the aerodynamic noise emission from the blades during operation.

According to a further aspect of the invention, a rotor blade for a wind turbine is provided, the rotor blade including at least one damping element which includes a laminate material made of at least one viscoelastic layer and at least one stiff layer adhered to said viscoelastic layer, wherein the damping element is attached to a body of the rotor blade so that the at least one viscoelastic layer is in contact with the body of the rotor blade.

In a rotor blade according to the above aspect of the present invention, kinetic energy from the bending and/or torsional motion of the blade body is transferred onto the soft viscoelastic layer attached to the body. The stiff layer adhered to the viscoelastic layer resists the motion of the viscoelastic layer so that shear stress is produced between the stiff layer and the viscoelastic layer. Thus, the vibrational energy of the torsional and/or bending modes is dissipated at the interface between the viscoelastic layer and the stiff layer. Thus, blade dynamic fatigue is reduced and blade lifetime is enhanced. Furthermore, the damping element has only low maintenance requirements due to its modular, simple and passive configuration.

According to another aspect of the invention, a wind turbine is provided which includes at least one rotor blade having at least one damping element which includes a laminate material made of at least one viscoelastic layer and at least one stiff layer adhered to said viscoelastic layer, wherein the damping element is attached to a body of the rotor blade so that the at least one viscoelastic layer is in contact with the body of the rotor blade.

The wind turbine according to the above aspect of the present invention has enhanced lifetime of the blades and reduced maintenance of blade fatigue fractures. Furthermore, damaged parts of the blade damping system can be exchanged in the field due to the modular nature of the blade damping system.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments of the invention, one or more examples of which are illustrated in the figures. Each example is provided by way of explanation of the invention, and is not meant as a limitation of the invention. For example, features illustrated or described as part of one embodiment can be used on or in conjunction with other embodiments to yield yet a further embodiment. It is intended that the present invention includes such modifications and variations.

Figure 1:
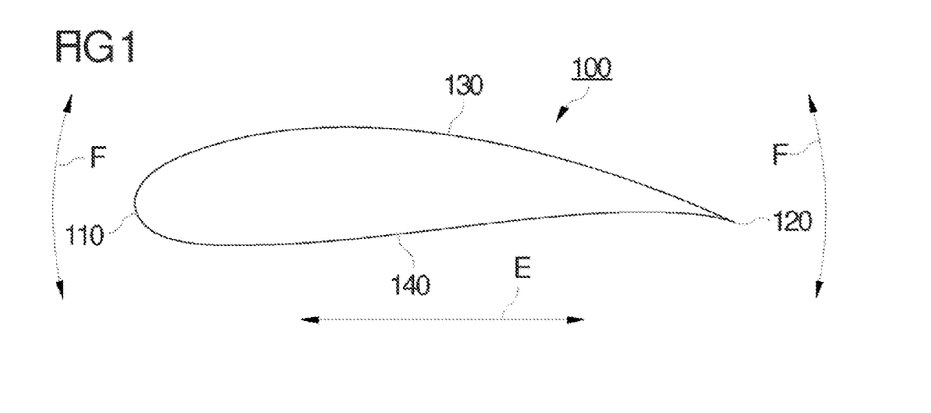
FIG. 1 shows a cross-sectional view of a wind turbine rotor blade.

FIG. 1 shows a cross-sectional view of a wind turbine rotor blade. The cross-section is taken in a plane perpendicular to the longitudinal axis of the blade so that the airfoil or blade contour is shown. The body of the rotor blade 100 has a leading edge 110 and a trailing edge 120 which are connected by a suction side 130 and a pressure side 140. Typically, the blade body 100 is made of fiber glass reinforced plastic (FGRP). Further details of the blade body configuration are well-known in the art and will, therefore, only be discussed in the present application when necessary with respect to the present invention.

Furthermore, two torsional and/or bending modes of the rotor blade 100 are indicated by arrows E and F. Arrow E describes a back-and-forth motion along the blade chord, i.e. from the leading edge to the trailing edge. Therefore, this mode is also called an edgewise deflection of the blade. Since the blade is fixed to a rotor hub of the wind turbine, the edgewise deflection results in a tilting moment onto the flange connection at the blade root. Thus, fatigue loads are applied to the blade root connection by the edgewise deflection of the blade. The other mode indicated by arrows F is a bending of the blade in a direction from the suction side to the pressure side and vice versa. Therefore, this bending mode is also called a flapwise deflection of the blade. The flapwise deflection of the blade causes internal stresses in the blade body and alters the effective aerodynamic shape of the blade, i.e. the blade contour.

Figure 2:
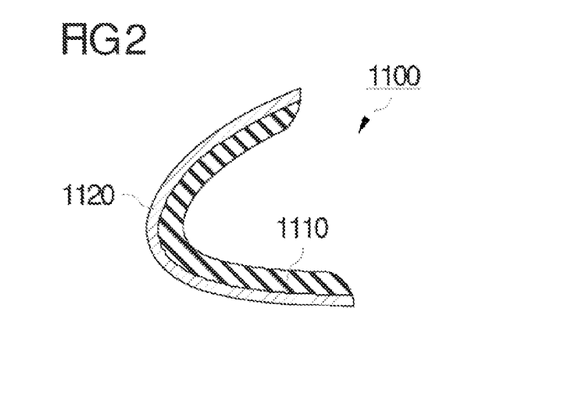
FIG. 2 shows a cross-sectional view of a leading edge damping element according to an embodiment of the present application.

FIG. 2 shows a cross-sectional view of a leading edge damping element 1100 according to an embodiment of the present applications. The damping element 1100 includes a laminate material made of a viscoelastic layer 1110 and a stiff or constrained layer 1120 adhered to the viscoelastic layer 1110. It should be understood that FIG. 2 shows only a cross-sectional view of the damping element 1100 which extends along at least a part of the longitudinal axis of the rotor blade. Typically, damping element 1100 extends along 5% to 100% of the blade length. In other words, damping element 1100 resembles a C-shaped paneling.

Typically, the viscoelastic layer is relatively soft having a high loss factor, greater than 0.1, as defined by the ratio between the energy dissipated by vixcous damping and the elastic energy of the material. In general, all elastomers having sufficient tensile and shear modulus can be used for the viscoelastic layer. In this context, it should be understood that a sufficient shear stiffness of the viscoelastic layer is at least one order of magnitude smaller than a shear stiffness of the blade body material, e.g. FGRP. In other words, the viscoelastic layer should be substantially softer than the blade body material. Typically, the viscoelastic layer or elastomeric layer 1110 includes at least one of the following materials: natural rubber, acrylic rubber, butadiene rubber, butyl rubber, chloroprene, chlorinated polyethylene, ethylene-propylene-diene, fluorosilicone rubber, fluorocarbon rubber, nitrile rubber, polyethylen, polyvinyl chloride, polymethyl methacrylate, polybutabiene, polypropylene, polyisobutylene, polyurethane, polyvinyl acetate, polyisoprene, stryene butadiene, silicone rubber, urethane rubber. In contrast, a shear stiffness of the stiff or constrained layer 1120 is of the same order as a shear stiffness of a blade body material. Therefore, the constrained layer 1120 is typically formed of a metal, typically steel, galvanized steel or aluminum, but also fiber reinforced plastic can be used. In particular, the same material that is used for the blade body 100 may also be used for the constrained layer 1120. The above-described laminate material has excellent damping properties due to its viscoelastic layer but also a sufficient structural strength due to its constrained layer. Especially, the material does not suffer as much as known fiber laminate materials from vibrational strain since the metallic constrained layer is more elastic compared to a fiber material with a glassy state resin-matrix.

Figure 3:
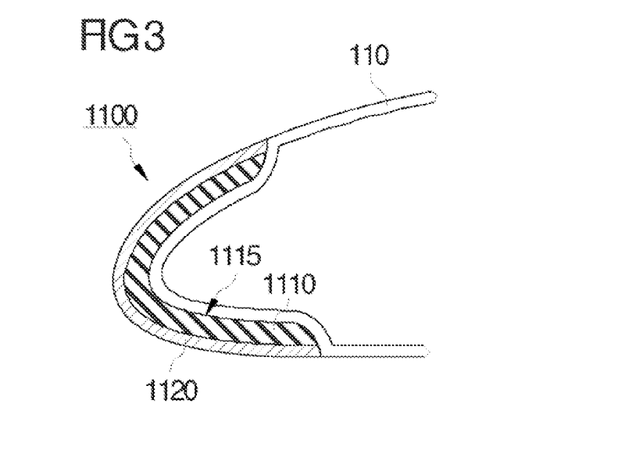
FIG. 3 shows the leading edge damping element of FIG. 2 when being mounted to the leading edge of a blade body.

FIG. 3 shows the leading edge damping element 1100 of FIG. 2 when being mounted to the leading edge 110 of a blade body. As is shown in FIG. 3, damping element 1100 is adapted to be attached to an outside surface of the leading edge portion 110 of the rotor blade body. In particular, damping element 1110 has a shape so that the stiff or constrained layer 1120 of the damping element forms a part of the blade contour, i.e. it complements the blade profile. The damping element 1100 is glued to the outer surface of trailing edge portion 110 by a glue layer 1115. The glue 1115 should be selected based on the following criteria: strength, bonding life, and resistance to environmental conditions. Glues fulfilling the aforementioned criteria are known to those skilled in the art. Typically, glue 1115 is selected to have a shear stiffness higher than the shear stiffness of the viscoelastic layer 1110. Thus, shear strain is produced in the viscoelastic layer 1110 and not in glue layer 1115 so that the bonding life of the glue is enhanced and peeling-off is avoided.

Next, the damping mechanism underlying damping element 1100 is described. In this context, it should be understood that the leading edge damping element 1100 is designed for damping edgewise deflection but the following explanations also apply to damping elements for flapwise deflection. The viscoelastic layer 1110 damps the vibrations of the blade body 100. Additional damping is provided by the constrained layer 1120, i.e. the system works as a glued 3-layer sandwich of the vibrating structure surface 110 (e.g. steel or FGRP), the viscoelastic (elastomer) layer 1110 and the constrained layer (e.g. steel or FGRP). When the vibrating blade body 100 is excited at a given frequency, the viscoelastic layer deforms in between the vibrating body 100, which assumes a specific deformed shape (vibrating mode shape), and the constrained layer 1120. Since the deformed shape of the vibrating blade body 100 forces the stiff constrained layer 1120 to deform, the soft viscoelastic layer 1110 in between has to follow with significant in-plane deformation. This in-plane deformation induces shear strain and associated stress, particularly the more each viscoelastic layer is deformed the higher is the stress. Since viscoelastic materials have high viscous behavior when elastically deformed, high shear strain regions in the viscoelastic layer lead to high viscous loss, i.e. the generation of heat, thus introducing high modal damping. Thus, the low frequency torsional or bending modes of the rotor blade 100 are damped.

According to a further embodiment of the present invention, the stiff layer 1120 may include or be exclusively made of a metal and/or a carbon fiber reinforced plastic. Thus, stiff layer 1120 can be formed as an electrically conducting member and may serve as a part of a lighting protection device for the rotor blade. Furthermore, erosion of the leading edge FGRP material due to dust particles is a common problem in the field of wind turbines. By using a meal stiff layer 1120 for the leading edge damping element 1100, erosion resistance of the blade is enhanced compared with pure FGRP blades.

It should be understood that the above explanation, especially regarding materials, physical properties, damping mechanism or the like, will also apply to the other embodiments of the present invention described below and will not be repeated to avoid redundancy. However, differences of one embodiment to the other embodiments will be explicitly described.

Figure 4:
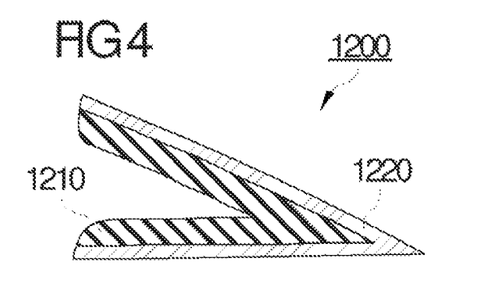
FIG. 4 shows a cross-sectional view of a trailing edge damping element according to an embodiment of the present application.
Figure 5:
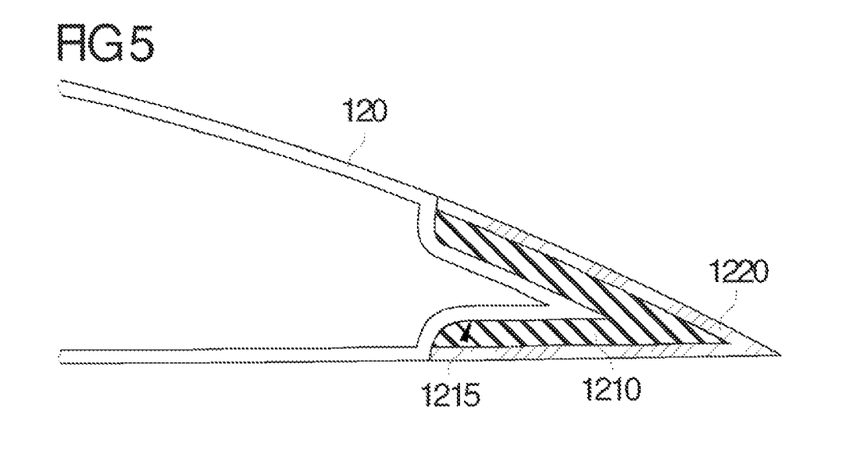
FIG. 5 shows the trailing edge damping element of FIG. 4 when being mounted to the trailing edge of a blade body.

FIG. 4 shows a cross-sectional view of a trailing edge damping element 1200 according to an embodiment of the present application. The basic configuration is similar to leading edge damping element 1200, i.e. a stiff or constrained layer 1220 is adhered to a viscoelastic layer 1210. Of course, the shape of trailing edge damping element 1200 is adapted to fit with the trailing edge of the blade 100 as is shown in FIG. 5. In particular, viscoelastic layer 1210 is glued to the trailing edge 120 of the blade body by a glue layer 1215.

Figure 6:
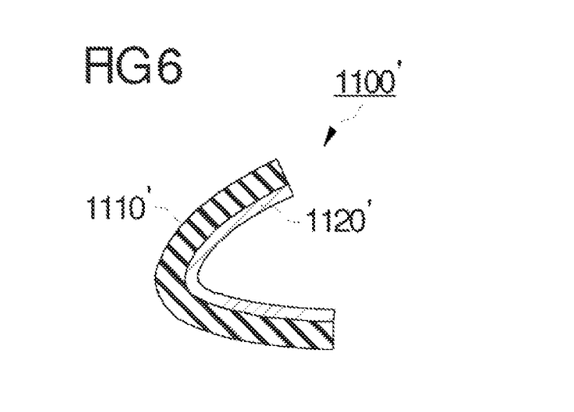
FIG. 6 shows a cross-sectional view of a leading edge damping element according to another embodiment of the present application.
Figure 7:
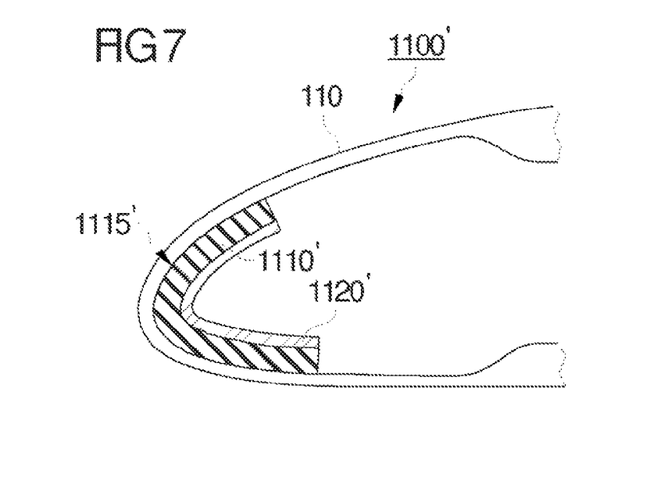
FIG. 7 shows the leading edge damping element of FIG. 6 when being mounted to the leading edge of a blade body.

FIG. 6 shows a cross-sectional view of a leading edge damping element 1100' according to another embodiment of the present application. Leading edge damping element 1100' is adapted to be attached to an inside surface of a leading edge portion of the rotor blade body. Therefore, the order of viscoelastic layer 1110' and stiff layer 1120' is reversed compared with leading edge damping element 1100 shown in FIG. 2. FIG. 7 shows the leading edge damping element 1100' of FIG. 6 when being glued to the leading edge 110 of a blade body by means of a glue layer 1115'.

Figure 8:
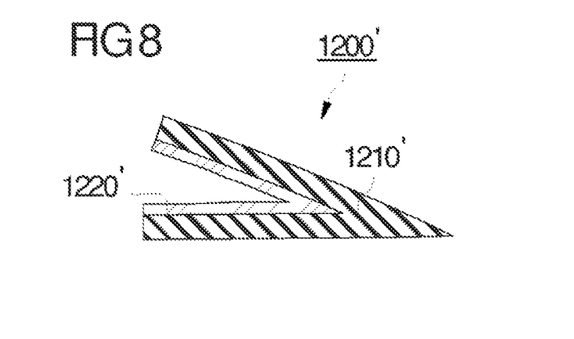
FIG. 8 shows a cross-sectional view of a trailing edge damping element according to another embodiment of the present application.
Figure 9:
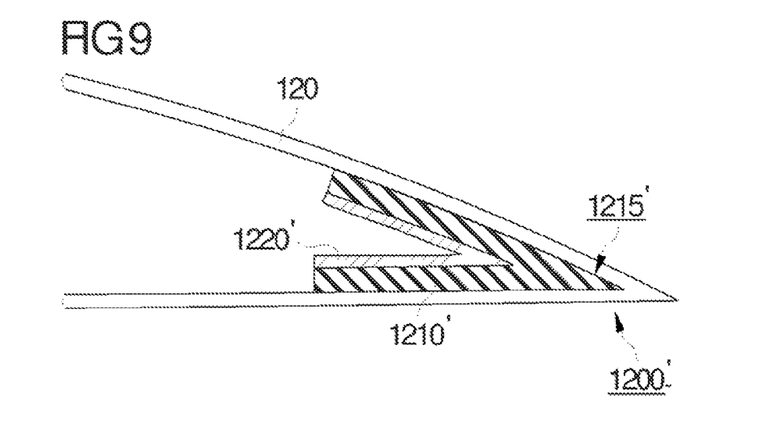
FIG. 9 shows the trailing edge damping element of FIG. 8 when being mounted to the trailing edge of a blade body.

FIG. 8 shows a cross-sectional view of a trailing edge damping element 1200' according to another embodiment of the present application. Similar to leading edge damping element 1100', also trailing edge damping element 1200' is adapted to be attached to an inside surface of a trailing edge portion 120 of the rotor blade body. Therefore, the order of viscoelastic layer 1210' and stiff layer 1220' is reversed compared with trailing edge damping element 1100 shown in FIG. 4. FIG. 9 shows the trailing edge damping element 1200' of FIG. 8 when being glued to the trailing edge 120 of a blade body by means of a glue layer 1215'.

Figure 10:
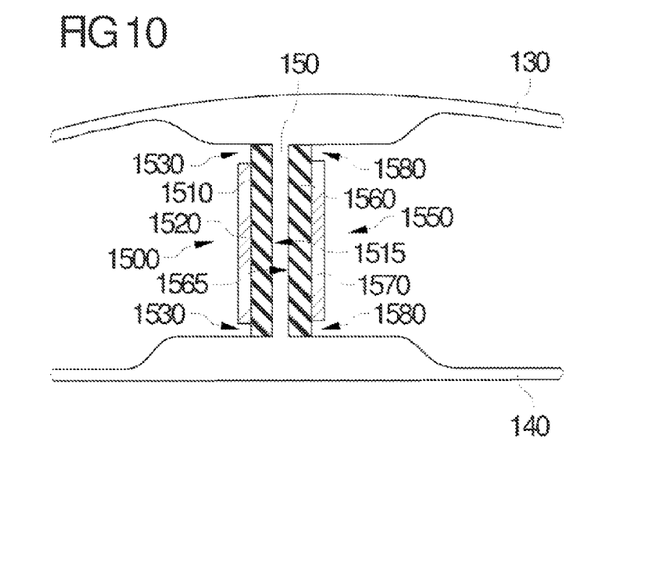
FIG. 10 shows a shear web damping element according to an embodiment of the present invention when being mounted to a web of a blade body.

FIG. 10 shows shear web damping elements 1500, 1550 according to an embodiment of the present invention when being mounted to a web 150 of a blade body 100. The spar web extends inside the blade body from the suction side 130 to the pressure side 140 of the blade. Although two damping elements 1500, 1550 are shown in FIG. 10, it should be understood that the invention may also be implemented by only a single damping element, e.g. damping element 1500. Both damping elements 1500, 1550 have a substantially flat configuration and are attached to opposite surfaces of web 150. The damping elements 1500, 1550 include viscoelastic layers 1510, 1560 to which stiff layers 1520, 1570 are adhered. Viscoelastic layers 1510, 1560 are glued to web 150 by means of glue layers 1515, 1565. It should be noted that stiff layers 1520, 1570 are spaced from the blade body by respective gaps 1530, 1580. Thus, stiff layers 1520, 1570 are not in direct contact with the blade body and torsional and/or bending motion of the blade body is transferred onto stiff layers 1520, 1570 only via viscoelastic layers 1510, 1560. Shear web damping elements 1500, 1550 are capable of damping flapwise deflection of the rotor blade.

Figure 11:
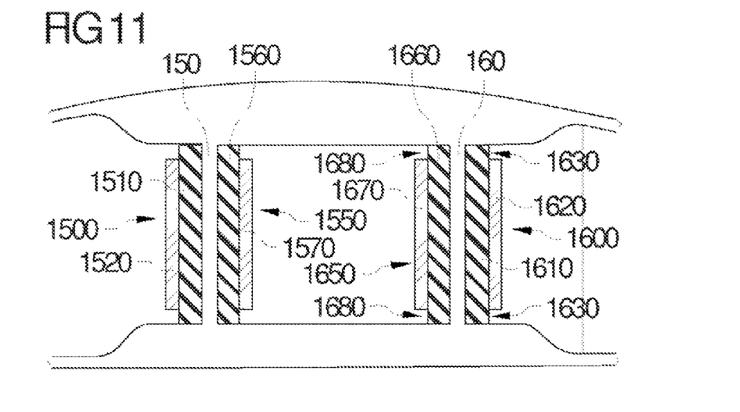
FIG. 11 shows a double shear web damping element according to another embodiment of the present invention when being mounted to a double web of a blade body.

FIG. 11 shows a double shear web damping element according to another embodiment of the present invention when being mounted to a double web of a blade body. The double shear web includes a first web 150 and a second web 160. Both webs 150, 160 are provided with shear web damping elements 1500, 1550, 1600, 1650 of the same or a similar configuration as the embodiment shown in FIG. 10. Of course, a double shear web damping system as shown in FIG. 11 will have increased damping capability compared with the single web system shown in FIG. 10.

Figure 12:
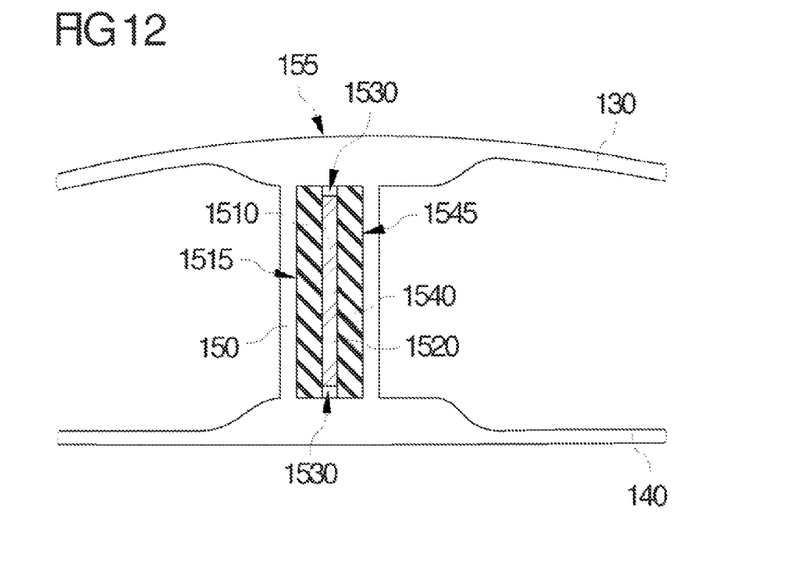
FIG. 12 shows a shear web damping element according to a further embodiment of the present invention when being mounted inside a cavity of a web of a blade body.

FIG. 12 shows a shear web damping element according to a further embodiment of the present invention. In this embodiment, the shear web 150 is designed as a hollow shear web providing an inner cavity 155. The damping element includes two viscoelastic layers 1510, 1540 and a stiff or constrained layer 1520 sandwiched between both viscoelastic layers. The viscoelastic layers 1510, 1520 are attached to the surfaces of the inner cavity 155 of the shear web portion 150 by glue 1515, 1545. It should be noted that the stiff layer 1520 is spaced from the blade body by gaps 1530. Thus, stiff layer 1520 is not in direct contact with the blade body and torsional and/or bending motion of the blade body is transferred onto stiff layer 1520 only via viscoelastic layers 1510, 1540. Shear web damping element 1500 is capable of damping flapwise deflection of the rotor blade.

Figure 13:
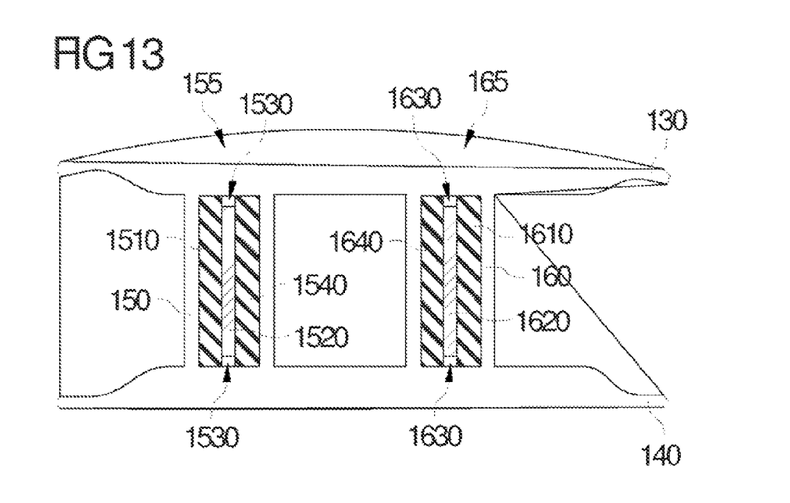
FIG. 13 shows a double shear web damping element according to an even further embodiment of the present invention when being mounted inside the cavities of a double shear web of a blade body.

FIG. 13 shows a double shear web damping element according to an even further embodiment of the present invention. Therein, a second damping element 1600 of identical or similar configuration as the damping element shown in FIG. 12 is mounted inside a cavity 165 of a second web 160. The above explanations with respect to the embodiment shown in FIG. 12 apply also to the double shear web configuration shown in FIG. 13.

Figure 14:
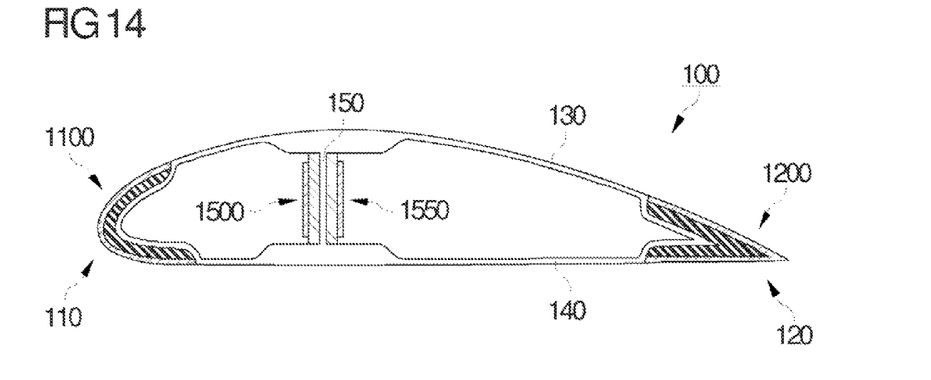
FIG. 14 shows a cross-sectional view of a wind turbine rotor blade according to an embodiment of the present invention.

FIG. 14 shows a cross-sectional view of a wind turbine rotor blade according to an embodiment of the present invention. Therein, a cap-type leading edge damping element 1100 is mounted to the leading edge 110 of the blade 100, a cap-type trailing edge damping element 1200 is mounted to the trailing edge 120, and damping elements 1500, 1550 are mounted to the shear web 150. Accordingly, edgewise and flapwise deflection of the blade will be dampened. Furthermore, trailing edge damping element 1200 may also be adapted to reduce so-called trailing edge noise which is caused by interference of the tailing edge with air turbulence.

Figure 15:
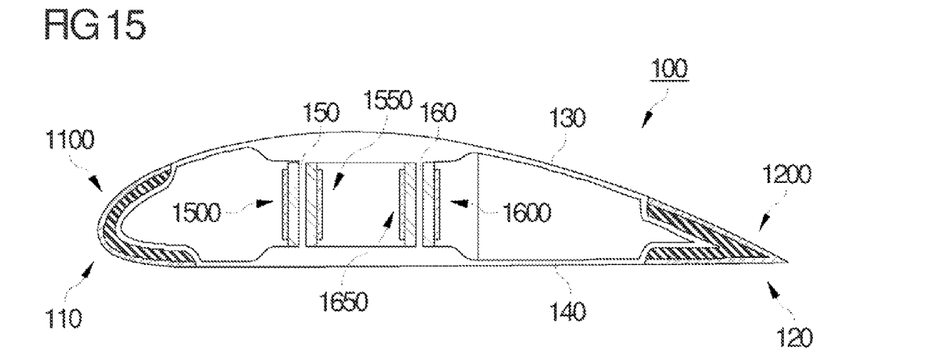
FIG. 15 shows a cross-sectional view of a wind turbine rotor blade according to another embodiment of the present invention.

FIG. 15 shows a cross-sectional view of a wind turbine rotor blade according to another embodiment of the present invention. This embodiment is similar to the embodiment shown in FIG. 14 but includes a double shear web structure so that flapwise deflection is even more suppressed.

Figure 16:
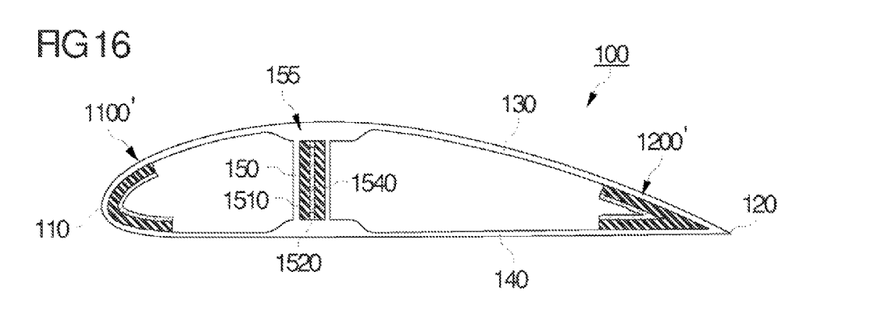
FIG. 16 shows a cross-sectional view of a wind turbine rotor blade according to a further embodiment of the present invention.

FIG. 16 shows a cross-sectional view of a wind turbine rotor blade according to a further embodiment of the present invention. Therein, a leading edge damping element 1100' is mounted to an inside surface of the leading edge 110, a trailing edge damping element 1200' is mounted to an inside surface of the trailing edge 120, and a damping element 1500 is mounted inside a cavity 155 of the shear web 150. Accordingly, edgewise and flapwise deflection of the blade will be dampened.

Figure 17:
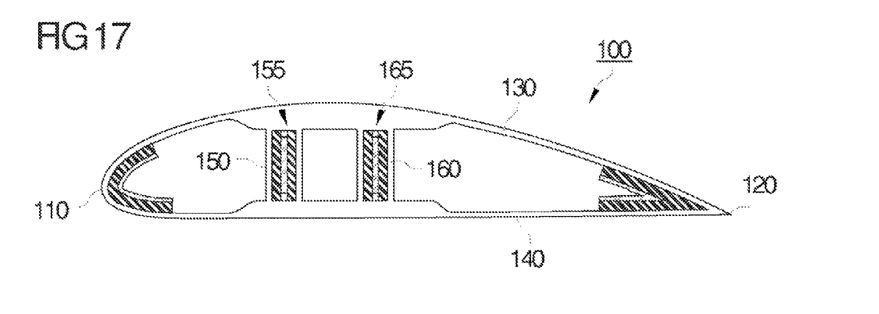
FIG. 17 shows a cross-sectional view of still another wind turbine rotor blade according to an embodiment of the present invention.

FIG. 17 shows a cross-sectional view of still another wind turbine rotor blade according to an embodiment of the present invention. This embodiment is similar to the embodiment shown in FIG. 16 but includes a double shear web structure so that flapwise deflection is even more suppressed.

It should be understood that the configurations shown in FIGS. 14 to 17 are exemplary but not limiting in the sense that leading edge, trailing edge and/or shear web damping elements of any of the above describe configurations may be combined with one another in a rotor blade. Furthermore, only a leading edge, a trailing edge or a shear web damping element may be provided as well as any combination of damping elements. This high flexibility is due to the modular design of the damping elements which also allows retrofitting of existing turbines in the field.

Finally, a wind turbine including rotor blades of the aforementioned configurations may benefit from improved blade lifetime and reduced noise emission and may also have an increase in yield.

This written description uses examples to disclose the invention, including the best mode, and also to enable any person skilled in the art to made and use the invention. While the invention has been described in terms of various specific embodiments, those skilled in the art will recognize that the invention can be practiced with modification within the spirit and scope of the claims. Especially, mutually non-exclusive features of the embodiments described above may be combined with each other. The patentable able scope of the invention is defined by the claims, and may include other examples that occur to those skilled in the art. Such other examples are intended to be within the scope of the claims of they have structural elements that do not differ from the literal language of the claims, or if they include equivalent structural elements with insubstantial differences from the literal languages of the claims.

What is claimed is:

1. A rotor blade comprising:
    a pressure side;
    a suction side;
    a first shear web connecting the pressure side to the suction side; and
    at least one damping element comprising a laminate material comprising:
        at least one viscoelastic layer attached to the first shear web and in direct contact with the pressure side and the suction side; and
        a stiff layer disposed on the at least one viscoelastic layer,
    wherein there are a first gap between the stiff layer and the pressure side, and a second gap between the stiff layer and the suction side, and the at least one viscoelastic layer does not occupy the first gap and the second gap.

2. The rotor blade of claim 1, wherein the first shear web comprises two surfaces which are opposite to each other, the at least one damping element comprising two damping elements attached to the two surfaces of the first shear web, respectively.

3. The rotor blade of claim 1, further comprising a second shear web spaced apart from the first shear web and connecting the pressure side to the suction side, the at least one damping element comprising four damping elements, two of the four damping elements being attached to opposite surfaces of the first shear web, respectively, the remaining two of the four damping elements being attached to opposite surfaces of the second shear web, respectively.

4. The rotor blade of claim 1, wherein the first shear web has a cavity defined in part by two surfaces facing each other, the at least one damping element comprising only one damping element disposed in the first cavity, the at least one viscoelastic layer comprising two viscoelastic layers sandwiching the stiff layer and attached to the two surfaces, respectively.

5. The rotor blade of claim 1, further comprising a second shear web spaced apart from the first shear web and connecting the pressure side to the suction side, each of the first shear web and the second shear web having a cavity defined in part by two surfaces facing each other, the at least one damping elements comprising two damping elements disposed in the first cavity and the second cavity, respectively, the at least one viscoelastic layer of each of the two damping elements comprising two viscoelastic layers sandwiching the respective stiff layer and attached to the two surfaces, respectively.

6. The rotor blade of claim 1, wherein the stiff layer comprises at least one of a metal and a carbon fiber reinforced plastic.

7. The rotor blade of claim 1, further comprising a glue layer disposed between the at least one viscoelastic layer and the first shear web, the at least one viscoelastic layer having a first shear stiffness, the glue layer having a second shear stiffness higher than the first shear stiffness.

8. The rotor blade of claim 1, wherein the at least one viscoelastic layer has a first shear stiffness which is at least one order of magnitude smaller than a shear stiffness of the first shear web.

9. The rotor blade of claim 8, wherein the stiff layer having a shear stiffness which is of the same order as the shear stiffness of the first shear web.

10. A wind turbine comprising at least one rotor blade of claim 1.

* * * * *

UNITED STATES PATENT AND TRADEMARK OFFICE
CERTIFICATE OF CORRECTION

| | | |
|---|---|---|
| PATENT NO. | : 7,811,063 B2 | Page 1 of 1 |
| APPLICATION NO. | : 11/556291 | |
| DATED | : October 12, 2010 | |
| INVENTOR(S) | : Laurent Bonnet | |

It is certified that error appears in the above-identified patent and that said Letters Patent is hereby corrected as shown below:

In Column 4, Line 12, delete "applications." and insert -- application. --, therefor.

In Column 4, Line 38, delete "stryene" and insert -- styrene --, therefor.

In Column 5, Line 6, after "that" delete "the".

In Column 5, Line 37, delete "meal" and insert -- metal --, therefor.

In Column 5, Line 40, delete "explanation," and insert -- explanations, --, therefor.

In Column 7, Line 7, delete "tailing" and insert -- trailing --, therefor.

In Column 7, Line 30, delete "describe" and insert -- described --, therefor.

In Column 7, Line 43, delete "made" and insert -- make --, therefor.

In Column 7, Line 49, after "patentable" delete "able".

Signed and Sealed this
Tenth Day of May, 2011

David J. Kappos
*Director of the United States Patent and Trademark Office*